Sept. 21, 1954  W. W. HECKERT  2,689,839
DISPERSION OF DELUSTERANTS IN POLYAMIDES
Filed Aug. 22, 1951
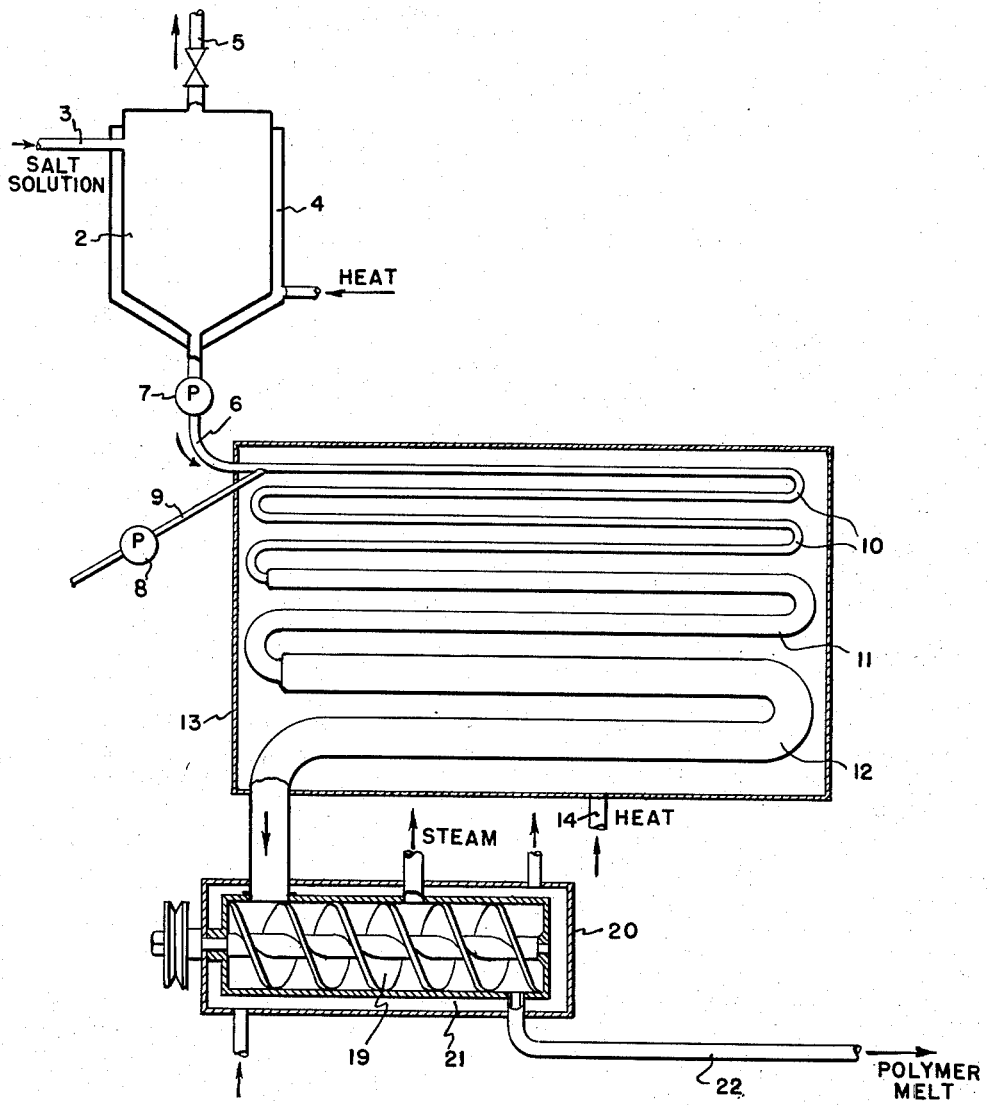
INVENTOR:
WINFIELD W. HECKERT
BY
ATTORNEY.

Patented Sept. 21, 1954

2,689,839

UNITED STATES PATENT OFFICE 2,689,839

DISPERSION OF DELUSTERANTS IN POLYAMIDES

Winfield W. Heckert, Wilmington, Del., assignor to E. I. du Pont de Nemours and Company, Wilmington, Del., a corporation of Delaware Application August 22, 1951, Serial No. 243,139

2 Claims. (Cl. 260—37)

This invention relates to the delustering of polymeric material and, more particularly, to a continuous process for obtaining a uniform dispersion of delusterant in superpolyamides.

The basic method of making the fiber-forming polyamides and the fibers therefrom is described in detail in U. S. Patents 2,071,250, 2,071,253, 2,130,948, and 2,190,770 by W. H. Carothers. These fiber-forming polyamides are linear condensation products and are made by continued heating under polymerizing conditions of bifunctional reactants with the removal of the volatile reaction products until the product obtained is capable of being drawn into a filament which may be further "cold drawn" into a useful fiber showing, by X-ray examination, orientation along the fiber axis. The fiber-forming polyamides, that is, the superpolyamides as described in the mentioned patents, are made from polyamide-forming reactants such as a diamine plus a dibasic acid or a polymerizable amino acid. The preferred polyamides, however, are those made from diamines and dibasic acids, the dibasic acids for the purpose of this invention including their amide-forming derivatives.

U. S. Patent 2,361,717 to Taylor has shown how these superpolyamides may be made continuously rather than by the batch process of Carothers. Taylor discloses continuously passing an aqueous solution of a diamine-dicarboxylic acid salt at super atmospheric pressure and at amide-forming temperatures continuously through a long tubular reactor divided into separate sections which are maintained at different conditions of pressure and temperature. The initial temperature-pressure conditions are such that the formation of steam is prevented and the rate of travel of the solution is such that a major portion of the salt is converted to polyamide. The reaction mass is then further subjected to amide-forming temperatures at pressures permitting the formation of steam, to remove water from the reaction composition as steam until the composition consists essentially of polyamide.

The advantage of the Taylor continuous process described above is that the superpolyamide may be made more economically and uniformly. However, difficulties arise in attempting to incorporate delusterants. If delusterant is added to the aqueous salt solution, it settles out in the long tubular reactor. Mechanical agitation cannot practically be adapted for avoiding separation from the stream continuously flowing through the tube. Addition of delusterant to the polymer is not practical, especially when the polymer is to be spun by the preferred procedure of melt spinning. The superpolyamides are solids at ordinary temperatures and are frequently so tough that ball mill grinding is accomplished with difficulty. Ball mill or colloid mill grinding methods are also difficult to apply to the molten polymers because of the high viscosity in the mill and the decomposition of the polymer during the prolonged treatment. Addition of the pigment dispersions in a solvent for the polymer followed by removal of the solvent is disadvantageous because of the long time intervals required during which the polymer tends to undergo objectionable transformation. Furthermore, the polymer is so viscous in the molten state that direct addition of the pigment and thorough dispersion thereof are often extremely difficult or impossible.

An object of this invention is to provide improvements over the process and apparatus disclosed in U. S. Patent 2,361,717, by means of which delusterant can be incorporated in superpolyamides during formation in a continuous operation. A further object is to obtain a uniform dispersion of delusterant in small discrete particles throughout the polyamide fiber-forming material without the aid of positive mechanical agitation. Other objects will become apparent from the disclosure, the drawing, and the claims.

The objects of the invention are accomplished by flowing a molten reaction mass of partially polymerized polyamide and at least about 10% of liquid water from a zone of high pressure through a heated passageway of suitable dimensions to utilize fluid friction to gradually reduce the pressure on the flowing mass to progressively flash the water into steam while maintaining the temperature of the mass above the melting point, and metering delusterant under pressure into the flowing reaction mass in a zone where the liquid water content of the mixture prior to the addition of the delusterant is in the range of 5 to 20% by weight. The partially reacted mixture will usually be introduced into the tube with a water content of 10 to 20% and the delusterant can then be added to the flowing mixture as it enters the flash tube or even after the mixture has progressed a considerable distance through the flash tube. The delusterant is readily added as an aqueous slurry, which may have been preheated before injection.

In the drawing, the figure illustrates schematically an arrangement of apparatus utilizing the principles of the invention.

An evaporator-reactor is indicated at 2. An aqueous solution of diamine-dicarboxylic acid salt is introduced continuously through pipe 3. The reactor is heated by suitable means, as by supplying hot vapor to jacket 4, to initiate the polymerization reaction and drive off part of the water, steam being removed through vent 5. The partially polymerized material is withdrawn through pipe 6 and forced by pump 7 into flash tube 10. At this point the delusterant is introduced into the stream of low molecular weight material by pump 8 through pipe 9. For a throughput of about 300 pounds of highly delustered polymer per hour, on a dry basis, tube 10 may suitably be 100 feet of ½ inch schedule 40 I. P. S. stainless steel tubing. From tube 10 the reaction mass passes into tube 11, which may suitably be 50 feet of 1¼ inch schedule 80 I. P. S. stainless steel tubing. The reaction mass then passes through tube 12, suitably 50 feet of 2 inch schedule 80 I. P. S. stainless steel tubing. While stainless steel is preferably used in the apparatus, other material may obviously be used. The determining factors in choice of material are adequate corrosion resistance, freedom from product contamination, acceptable heat transfer properties, and high strength at operating temperatures and pressures.

Flash tubes 10—12 are surrounded by a heating jacket 13, to which heating fluid is supplied through pipe 14 to maintain the tubes at the desired operating temperature. From tube 12 the polymer may be passed by screw conveyor 19 through finisher 20 to provide for separation of steam. The finisher is heated by jacket 21. The finished polymer is then ready to be passed to a spinning operation through pipe 22.

The simple expedient of metering the preheated suspension of delustering agent into the flowing polyamide-forming material just before it enters the tube (as shown in the drawing), or subsequently at a point in the tube where the water content of the material is from 5 to 20%, has produced the surprising result of a uniformly delustered polymer without the aid of any mechanical agitation whatsoever. The delustering agent is introduced preferably as a 0.5 to 20% aqueous dispersion which has been preheated to about 150° C.

In actual practice polymers which contain from 0.02 to 5.0% by weight of delustering agent (a 250 fold difference) are produced in the same equipment. Metering pumps cannot practically cover the wide range in flow rates which would be required with a single concentration of an aqueous suspension of a delustering agent and hence, a variety of concentrations in the range 0.5 to 20% is necessary to produce the polymers with the desired widely different contents of delustering agent. It would be simpler to introduce the suspension of delusterant at room temperature. In practice this is possible only when a highly concentrated suspension is being used to produce a polymer with a low content of delustering agent; otherwise the large mass of cold suspension thus introduced into the flowing stream of polyamide-forming materials would cause some solidification and precipitation of the polymer (low molecular weight at this point). Preheating is thus essential in most cases. However, the preheat temperature of the aqueous dispersion of the delustering agent must not exceed the boiling point of water at the pressure being used to pump the fluid into the system, else the water will flash before the delustering agent gets into the polymer stream. Additionally, the suspension of delustering agent before it enters the flowing polymer stream must not be held at the elevated preheating temperature long enough to break the suspension and cause coagulation or agglomeration.

A preferred embodiment of the invention is described in the following example:

Example

A 47% solution of hexamethylenediamine-adipic acid salt in water is introduced into the evaporator-reactor vessel (heated by Dowtherm A vapor, a commercial mixture of 26.5% diphenyl, 73.5% diphenyl oxide) through which it flows with heating and with steam removal at 250 pounds per square inch gauge pressure until the temperature reaches 230° C. Into the solution of partially-formed polyamide exiting from this vessel and containing about 14% water is pumped a 10% aqueous suspension of titanium dioxide preheated to 150° C., the time interval from heating to injecting being not greater than 30 seconds. These merging streams flow through the flash tubes, which are heated with Dowtherm vapor at 300° C., where heat is supplied to furnish the latent heat of vaporization of water as it flashes off with reducing pressure during flow through the tubes. At the same time the heat gradually increases the temperature of the effluent polymer to 280° C. at substantially atmosphere pressure. The two-phase mixture of steam and polyamide is then passed into the finisher, which is heated by Dowtherm vapor to 275° C., where the steam is released to the atmosphere. Polymer passes through the finisher at atmospheric pressure over a period of about one hour, gradually losing water of reaction until the composition consists essentially of polyamide. The finished polymer as drawn off through pipe 22 has an intrinsic viscosity of 0.9 and contains 0.3% titanium dioxide.

The method of U. S. Patent 2,205,722 to Graves for preparaing delustered polyamides, which would call for adding the slurry of the delustering agent to the evaporator-reactor vessel, does not work in this continuous polymerizing process. The process of evaporation causes the delustering agent to coat out on the heat transfer surfaces and thus immediately reduces the efficiency of the evaporating process below an economic level. The addition of a mechanical stirrer to the vessel without the addition of a complicated valving or baffling would prevent the process from working since it would destroy the concentration gradient between the inlet at 47% salt solution and the outlet at 86%.

The fact that a uniformly delustered polymer is achieved by metering a slurry of the delustering agent into the flowing stream of the polyamide-forming materials just before these materials enter or while they are flowing through the flash tubes 10, 11 and 12 is indeed surprising. One would not suspect that the boiling action of the water vapor separating from the polyamide-forming mass in the flash tubes would be sufficient to disperse uniformly and to maintain in suspension the delustering agent, particularly since in the first part of the flash tubes the viscosity of the polyamide-forming material is relatively low, and the rate of water boil off is also relatively low. That the dispersing action in the flash tubes begins at once is seen by the fact that no delustering agent settles out and accumulates in the tubes. By the time the boiling action has subsided because the reaction mass has approached atmospheric pressure, the viscosity of the polymer is such that the delustering agent is maintained in suspension.

The diameters and lengths of the flash tubes are selected to provide, for a desired throughput capacity, adequate time for polymerization and vaporization of water to take place under the operating conditions, and reduction of pressure at a rate which will cause the water to flash into steam no faster than heat, to maintain desired operating temperatures, is supplied to the reaction mass by external heating. The gradual reduction of pressure resulting from fluid friction during flow through the tubes, provides for progressive vaporization of water at the operating temperature while the latent heat of vaporization is supplied by external heating, so that the mass is maintained molten at reaction temperature while the water is removed and the delusterant is dispersed through the mass.

Preferred pressure drop conditions when making highly delustered polymer (e. g., 5% $TiO_2$) are obtained with a set of three flash tubes in series, having diameters in the approximate ratio of 1:2:3 and lengths in the approximate ratio of 2:1:1, e. g., inside diameters of .62, 1.25, and 2.07 in. and the lengths of 100, 50 and 50 feet respectively, discussed previously. When making polymer with a low content of delusterant (e. g., according to the Spanagel invention disclosed in U. S. Patent No. 2,385,890) it is unnecessary to use three flash tubes. The last 50 feet of 2 inch pipe may be eliminated because of the smaller amount of water (entering with the delusterant) required to be removed.

It is seen that a variety of arrangements of suitable passageways of other dimensions may be selected by flow of fluid calculations based on the data for the preferred arrangement already given, taking into consideration the water content of the reaction mixture, the amount of aqueous dispersion of delusterant to be added, the reaction temperature or temperature range to be maintained, rate of flow and the pressure drop used for the process.

The optimum temperature at which the flash tubes may be used varies with the characteristics of the individual polyamide being prepared. In general, it can be said that the operating temperature may vary from 220° C. to 320° C., with the range 250° C. to 300° C. preferred. It is normal in the production of polyamides for the operating pressures to be in the range from about 500 pounds per square inch gauge down to about atmospheric pressure.

Polyamides and interpolyamides (suitable examples of which are shown in the Carothers patents referred to herein above), having an intrinsic viscosity within the useful fiber-forming range of 0.5–2.0, may be easily prepared using the process and apparatus described herein. Intrinsic viscosity as used herein is as defined in U. S. Patent 2,130,948 to Carothers.

By the use of such an apparatus in a continuous polymerizing process, the pressure on a polymeric material may be reduced and any volatile component vaporized without cooling the polymeric material below its solidification point. This is especially advantageous since any mechanism allowing rapid pressure reduction will be accompanied by a lowering of the temperature during vaporization usually resulting in solidification of the molten polymeric material and thus effectively preventing complete and homogeneous dispersion of the delustering material or agent. By this single stage process of substantially uniformly, and gradually reducing the pressure, and at the same time supplying the heat, the volatile material is vaporized starting almost immediately after the injection of the delustering slurry and is continued during the period when the polyamide-forming mass is becoming more viscous through the formation of higher molecular weight polyamides. When the final lower finishing pressure is attained, which is preferably atmospheric, and the polymer is no longer subjected to the boiling action caused by the flashing of the water vapor, the polymer viscosity has reached a sufficiently high level to prevent the settling of the delustering agent.

The delustering agents useful for the purposes of this invention are preferably finely-divided materials such as pigments which have a refractive index differing from that of the superpolyamide, which are incompatible therewith, and which are inert thereto. The term, "incompatible," is used with reference to such agents to indicate that the finely-divided material is insoluble in the superpolyamide at ordinary temperatures and forms a separate phase therefrom. The agent which is added to produce the heterogeneous phase is referred to as the delusterant. It may be a liquid or solid, but preferably it will be a solid. For proper delustering, the added agents must be in finely-divided stage and be so distributed throughout the polyamide surface and fiber as not to impair the continuity of the superpolyamide or destroy its fiber qualities.

The delusterants used in the practice of this invention must have an index of refraction which is different, that is, lower or higher, from that of the superpolyamide. The refractive index of most superpolyamides is approximately 1.55. This difference in refractive index between the delusterant and the superpolyamide should be at least 0.05 and preferably more than 0.2. The most useful delusterants, e. g. titanium dioxide, zinc sulfide, and other pigment-like materials, have indices of refraction which differ from that of the superpolyamides by at least 0.5. Furthermore, the delusterant must be present in the superpolyamide in a finely divided form. This is essential if the delusterant is added to superpolyamide which is to be spun so that the spinneret orifices will not become clogged. For the preparation of delustered superpolyamide fibers the particle size of the delusterant should be less than five microns and preferably less than one micron. If, however, the object to be produced is a bristle, sheet, film, or molded article, delusterants of larger particle size may be used. For these purposes the particle size may be as large as 25 microns. For the preparation of permanently delustered superpolyamide fibers and fabrics it is further essential that the delusterant be firmly coated or imbedded in the fiber; it should not be removed by the action of soap, water, or solvents of the type used in dry cleaning. The delusterant must be inert to the polyamide fiber-forming material, and it must incompatible therewith.

Of particular interest in this invention are the inorganic pigment-like materials which are especially valuable as delusterants for superpolyamides. Titanium dioxide is a particularly valuable delusterant since it has a refractive index which differs by more than 0.5 from that of the superpolyamide and is preferred for purposes of this invention because of its cheapness, availability, and dispersibility in an aqueous slurry. Numerous other materials of this type or of the organic delusterant type may be used; in fact, any agent listed in the U. S. Patent 2,205,722 to Graves is quite applicable. Not all of the compounds mentioned in the Graves patent, however, are useful for melt spinning, the materials suitable for this type of spinning are those which are stable at the elevated temperatures used in the process. In general, pigments, salts, hydrocarbons, chlorinated aromatic hydrocarbons, and related compounds are sufficiently stable for this purpose.

The quantity of delusterant used in the preparation of the fibers of this invention will depend upon the nature (degree of dispersion, refractive index, etc.) of the delusterant and upon the degree of opacity desired for the final product. In general, quantities of delusterant ranging from 0.1 to 5.0% by weight of the polyamide may be used, when the delusterant is dispersed throughout the fiber. In the case of titanium dioxide, for example, quantities of 0.1 to 2.0% are ordinarily employed for delustering purposes. Smaller amounts will deluster effectively only when the delusterant is present merely on the surface of the fiber. Quantities of delusterant outside of this range can be used, but the delusterant must not be present in an amount sufficient to impair the continuity of the superpolyamide or products of inferior flexibility and elasticity will result. It should also be noted that the invention described herein is equally applicable for producing polymers of the Spanagel invention disclosed in U. S. Patent 2,385,890, whereby a finely-divided inert material is homogeneously dispersed in a polyamide in an amount from 0.005 to 0.05%.

It will be seen from the foregoing description that this invention provides a convenient method for preparing fibers and other shaped objects with low or modified luster from superpolyamides. By varying the amount of delusterant used, products ranging from brilliant to subdued dull or even chalky appearance can be obtained. By the process of the invention, polyamides being made by a continuous process, can be successfully delustered, an attainment which was not previously possible. The process of this invention is unique in this respect, and thus makes possible the manufacture of delustered fibers, filaments, films, and the like from molten polymer which may be supplied directly to the spinning and extruding units from the continuous polymerizer. These delustered fibers, filaments, films, and the like are equal in tenacity, elasticity, resistance to solvents, aging qualities, etc., to similar products made from polymer prepared by the batch process.

As many different embodiments of the present invention may be made without departing from the spirit and scope thereof, it is to be understood that the invention is not limited to the specific embodiments disclosed except to the extent defined in the appended claims.

What is claimed is:

1. The process for preparing superpolyamides having delusterant uniformly distributed therethrough which comprises continuously flowing a molten reaction mass of partially polymerized polyamide containing in the polymer chain recurring carbonamide groups each attached directly to 2 carbon atoms in the polymer chain and at least 10% of water from a zone of high pressure through a long heated passageway, polymerizing the mass in said passageway by substantially uniformly and gradually reducing the pressure in the direction of flow to progressively flash the water into steam while supplying sufficient heat to maintain the temperature of the polymer above the melting point at all times, continuously introducing delusterant into the flowing mass during said polymerization while the temperature of the mass is from 220° to 320° C. and the water content of the mass is in the range of 5 to 20% by weight, and continuing polymerization of the delusterant-containing mass as specified until the desired degree of polymerization is obtained.

2. The process for preparing superpolyamides having delusterant uniformly distributed therethrough which comprises continuously flowing a molten recation mass of partially polymerized polyamide containing in the polymer chain recurring carbonamide groups each attached directly to 2 carbon atoms in the polymer chain and at least 10% of water from a zone of high pressure, conducting the flowing mass through a long passageway heated to maintain the temperature of the mass within the range of 220° to 320° C. and above the melting point at all times, polymerizing the flowing mass in said passageway by substantially uniformly and gradually reducing the pressure in the direction of flow to progressively flash the water into steam, continuously introducing delusterant as a 0.5 to 20% aqueous dispersion into the flowing mass during polymerization while the water content of the mass is in the range of 5 to 20% by weight, and continuing the polymerization of the flowing delusterant-containing mass until the desired degree of polymerization is obtained.

References Cited in the file of this patent

UNITED STATES PATENTS

| Number | Name | Date |
| --- | --- | --- |
| 1,666,597 | Harnsberger | Apr. 17, 1928 |
| 1,811,290 | Badger | June 23, 1931 |
| 1,903,807 | Doble | Apr. 18, 1933 |
| 2,090,586 | Ward | Aug. 17, 1937 |
| 2,278,878 | Hoff | Apr. 7, 1942 |
| 2,287,698 | Mills | June 23, 1942 |
| 2,323,899 | Day et al. | July 13, 1943 |
| 2,348,576 | Seguy | May 9, 1944 |
| 2,361,717 | Taylor | Oct. 31, 1944 |

FOREIGN PATENTS

| Number | Country | Date |
| --- | --- | --- |
| 980,573 | France | Dec. 27, 1950 |